US009691009B2

(12) United States Patent
Nomi et al.

(10) Patent No.: US 9,691,009 B2
(45) Date of Patent: Jun. 27, 2017

(54) PORTABLE OPTICAL READER, OPTICAL READING METHOD USING THE PORTABLE OPTICAL READER, AND COMPUTER PROGRAM

(71) Applicant: Keyence Corporation, Osaka (JP)

(72) Inventors: Taiga Nomi, Osaka (JP); Shusuke Oki, Osaka (JP)

(73) Assignee: Keyence Corporation, Osaka (JP)

( * ) Notice: Subject to any disclaimer, the term of this patent is extended or adjusted under 35 U.S.C. 154(b) by 78 days.

(21) Appl. No.: 14/679,039

(22) Filed: Apr. 6, 2015

(65) Prior Publication Data

US 2015/0310270 A1   Oct. 29, 2015

(30) Foreign Application Priority Data

Apr. 23, 2014   (JP) ................. 2014-089587

(51) Int. Cl.
*G06K 9/00*   (2006.01)
*G06K 9/72*   (2006.01)
*G06K 9/03*   (2006.01)
*G06K 9/22*   (2006.01)

(52) U.S. Cl.
CPC ............ *G06K 9/726* (2013.01); *G06K 9/033* (2013.01); *G06K 9/228* (2013.01); *G06K 2209/01* (2013.01)

(58) Field of Classification Search
CPC .... G06K 9/726; G06K 9/033; G06K 2209/01; G06K 9/228
USPC .......................................... 382/181
See application file for complete search history.

(56) References Cited

U.S. PATENT DOCUMENTS

| 5,557,789 | A  | * | 9/1996  | Mase ..................... G06K 9/03 |
| 6,269,189 | B1 | * | 7/2001  | Chanod ............. G06F 17/30985 382/229 |
| 6,327,385 | B1 | * | 12/2001 | Kamitani ............... G06K 9/344 382/177 |
| 6,978,044 | B2 | * | 12/2005 | Akagi ................. G06K 9/6206 382/187 |
| 7,203,663 | B1 | * | 4/2007  | Buisman .............. G06K 9/2054 705/38 |

(Continued)

FOREIGN PATENT DOCUMENTS

JP    H07-160799    6/1995

*Primary Examiner* — John Strege
(74) *Attorney, Agent, or Firm* — Kilyk & Bowersox, P.L.L.C.

(57) ABSTRACT

The present invention provides a portable optical reader, an optical reading method using the portable optical reader and a computer program capable of detecting a high possibility of a reading error and notifying a user of a possibility of a reading error. A character string as a reading target is imaged and a character string is recognized based on the captured image. A plurality of reading formats defining an attribute of the character string is stored, and a first reading format matched with the recognized character string among a plurality of stored reading format is searched. Among the plurality of stored reading formats, a second reading format in which a character string matched with the first reading format as a partial character string is searched. Based on the search result, a possibility of a reading error regarding the recognized character string is notified.

13 Claims, 21 Drawing Sheets

(56) References Cited

U.S. PATENT DOCUMENTS

| | | | | |
|---|---|---|---|---|
| 2001/0043740 A1* | 11/2001 | Ichikawa | ........... | G06K 9/00449 |
| | | | | 382/176 |
| 2004/0148158 A1* | 7/2004 | Kobayashi | .......... | G06F 17/2735 |
| | | | | 704/201 |
| 2009/0123071 A1* | 5/2009 | Iwasaki | ................ | G06K 9/2054 |
| | | | | 382/176 |
| 2012/0212788 A1* | 8/2012 | Miyazaki | ............. | H04N 1/0402 |
| | | | | 358/474 |
| 2014/0093172 A1* | 4/2014 | Tonogai | ................ | G06K 9/723 |
| | | | | 382/182 |
| 2014/0093173 A1* | 4/2014 | Napper | ................... | G06K 9/72 |
| | | | | 382/186 |
| 2014/0304634 A1* | 10/2014 | Kumazawa | ........... | G06F 3/0486 |
| | | | | 715/770 |
| 2015/0262030 A1* | 9/2015 | Kawabata | ................ | G06K 9/18 |
| | | | | 382/182 |

* cited by examiner

| No. | READING FORMAT | MATCHED PORTION | MATCHED RESULT | MATCHED CHARACTER STRING |
|---|---|---|---|---|
| 1 | YYYY.MM | 2013.12 | MATCHED | 2013.12 |
| 2 | YYYY.M | 2013.1 | MATCHED | 2013.1 |
| 3 | YYYY.MM.DD | 2013.12??? | AMBIGUOUSLY MATCHED | 2013.12.01~2013.12.31 |
| 4 | 3-DIGIT ENGLISH LETTER | ??? | AMBIGUOUSLY MATCHED | AAA~ZZZ |

FIG. 11

```
BASIC SETTINGS

FORMAT PATTERN        [DATE            ▽]

┌READING SETTINGS─────────────────────────┐
  │ READING COMBINATION  [1D/2D CODE ONLY ▽]│
  │ READING MODE (FOR OCR) [NORMAL        ▽]│
  │ WHILE/BLACK INVERSION  [BOTH          ▽]│
  │ (FOR OCR)                               │
  └─────────────────────────────────────────┘

┌ACTION AFTER READING─────────────────────┐
101│ READING CONFIRMATION [NOT DISPLAY    ▽]│
  │ SCREEN               ┌───────────────────┐
  │      ALERT SETTING   │NOT DISPLAY ▓▓▓▓▓ │
  │                      │DISPLAY EVERY TIME │
  │                      │DISPLAY WHEN AN ALERT IS GENERATED│
  └─────────────────────────────────────────┘

[  OK  ]   [ CANCEL ]
```

| RECOGNITION RESULT | ? | 3 | A | B | C | D | E | ? |
|---|---|---|---|---|---|---|---|---|
| MATCHING DEGREE | 10 | 80 | 60 | 50 | 100 | 100 | 80 | 20 |
| INDEFINITE THRESHOLD (30) OR MORE | | ○ | ○ | ○ | ○ | ○ | ○ | |
| HIGHLY RELIABLE THRESHOLD (70) OR MORE | | ○ | | | ○ | ○ | ○ | |

| No. | READING FORMAT | MATCHED PORTION | MATCHED RESULT | MATCHED CHARACTER STRING | EXTENDED DIRECTION |
|---|---|---|---|---|---|
| 1 | 4-DIGIT ENGLISH LETTER | ABCD | MATCHED | ABCD | - |
| 2 | 5-DIGIT ENGLISH LETTER | ABCDE | MATCHED | ABCDE | - |
| 3 | 6-DIGIT ENGLISH LETTER | ABCDE? | AMBIGUOUSLY MATCHED | ABCDEA~ABCDEF | RIGHT |

FIG. 21

| CHARACTER | WHITE PIXEL RATE (%) | EVALUATION VALUE A | CONTINUOUS NUMBER | EVALUATION VALUE B | OVERALL EVALUATION VALUE |
|---|---|---|---|---|---|
| 2 | 0 | 1 | 0 | 1 | 1 |
| 0 | 2 | 3 | 6 | 4 | 4 |
| 1 | 0 | 1 | 0 | 1 | 1 |
| 3 | 1 | 2 | 1 | 1 | 2 |
| / | 0 | 1 | 0 | 1 | 1 |
| 1 | 2 | 2 | 3 | 3 | 3 |
| 2 | 5 | 6 | 8 | 5 | 6 |

FIG. 25
FIG. 26
| No. | READING FORMAT |
|---|---|
| 1 | 4-DIGIT ENGLISH LETTER |
| 2 | 5-DIGIT ENGLISH LETTER |
| 3 | 3-DIGIT ENGLISH LETTER |
FIG. 27A
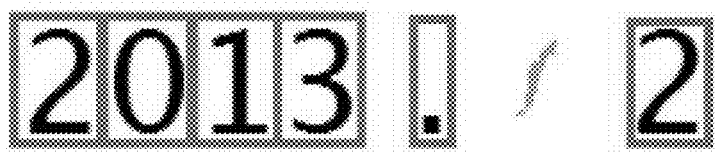
FIG. 27B
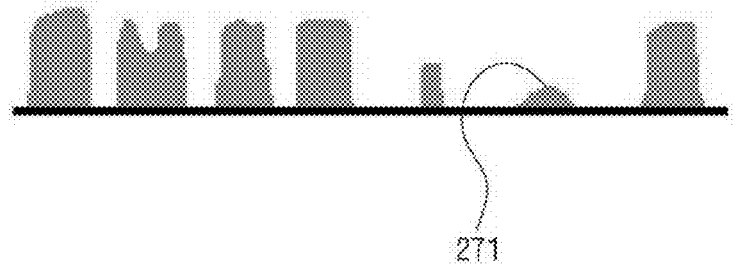

FIG. 29A
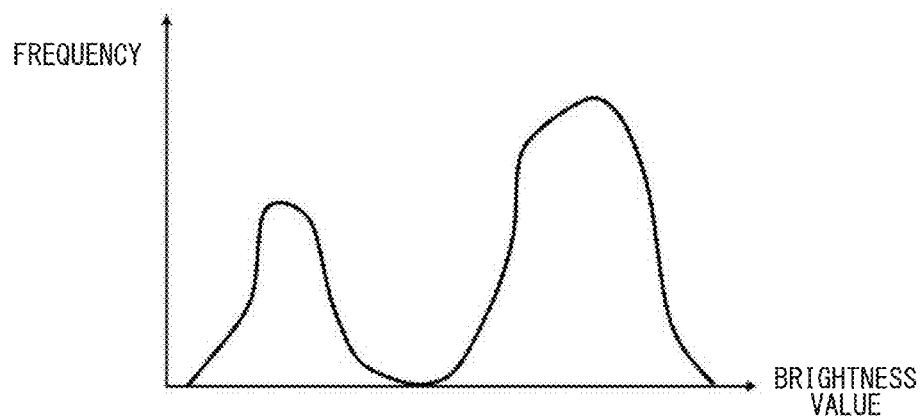
FIG. 29B
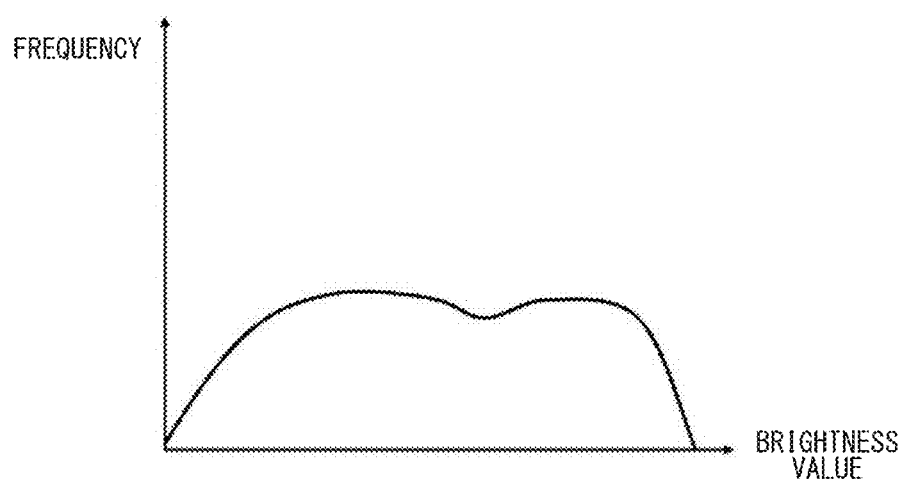
FIG. 30
| ITEM | EVALUATION VALUE (1-10) |
|---|---|
| 1 | 4 |
| 2 | 3 |
| 3 | 0 |
| 4 | 0 |
| 5 | 1 |
| 6 | 7 |
| 7 | 1 |

PORTABLE OPTICAL READER, OPTICAL READING METHOD USING THE PORTABLE OPTICAL READER, AND COMPUTER PROGRAM

CROSS-REFERENCE TO RELATED APPLICATIONS

The present application claims foreign priority based on Japanese Patent Application No. 2014-089587, filed Apr. 23, 2014, the contents of which is incorporated herein by reference.

BACKGROUND OF THE INVENTION

1. Field of the Invention

The present invention relates to a portable optical reader capable of notifying a user of a possibility of a reading error, an optical reading method using the portable optical reader, and a computer program.

2. Description of Related Art

Conventionally, various technologies for processing data by recognizing written characters using OCR, etc., have been developed. In a character recognition technology, the matching degree between a character image pre-registered in, e.g., a reference dictionary (master data) and a captured image is calculated, and a character highest in matching degree is output as a recognized character.

Further, in order to judge whether a character string constituted by a plurality of recognition characters are correctly read as a desired character string, a reading format is sometimes used. For example, in Patent Document (JP 07-160799), a character recognition system in which a reading format defining the number of digits of a character string is referred is disclosed.

In Patent Document (JP 07-160799), in the case of referring to a 10-digit reading format such as YYYY/MM/DD, etc., it is judged that reading was successfully performed when a character string "2013/12/25" was read.

In the same manner, in the case of referring to a 7-digit reading format such as YYYY/MM, etc., it is judged that reading was successfully performed when a character string "2013/12" was read.

SUMMARY OF THE INVENTION

However, for example, in cases where the number of digits of a character string as a reading target differs every goods (cardboard-packaging container, etc.) on which the character string is provided, it was necessary to change the setting to an appropriate reading format every number of digits, which was a cumbersome operation for a user. For this reason, in the case of using the character recognition system disclosed in Patent Document (JP 07-160799), a plurality of reading formats corresponding to a plurality of digits is prepared, and when it is judged that reading was successfully performed by any one of the reading formats, it is considered to be successful reading.

On the other hand, when a reading target is "2013/12/25," for example, in cases where the portion of "/25" is positioned outside the imaging area or halation (so-called "overexposure") occurs in the portion due to irradiated light, a character string of "2013/12" is read. In this case, in a 7-digit reading format, it is judged that reading was successfully preformed. Therefore, in the character recognition system disclosed in Patent Document (JP 07-160799), there is a problem that it is judged that reading was successfully preformed despite that reading was erroneously performed.

The present invention was made in view of the aforementioned circumstances, and aims to provide a portable optical reader capable of detecting a case in which a possibility of a reading error is high and notifying a user of the possibility of the reading error, an optical reading method using the portable optical reader, and a computer program.

To attain the aforementioned object, a portable optical reader according to a first invention include imaging unit configured to image a character string as a reading target, character string recognition unit configured to recognize the character string based on an image captured by the imaging unit, reading format storage unit configured to store a plurality of reading formats defining an attribute of a character string, first search processing unit configured to search a first reading format matched with a character string recognized by the character string recognition unit among a plurality of stored reading formats, second search processing unit configured to search a second reading format in which a character string matched with the first reading format matches as a partial character string among a plurality of stored reading formats, and notification unit configured to notify a possibility of a reading error regarding the recognized character string based on a search result of the second search processing unit.

Further, according to a portable optical reader according to a second invention, in the first invention, the notification unit notifies a possibility of a reading error when a matched second reading format is searched in the second search processing unit.

Further, according to a portable optical reader according to a third invention, in the first or second invention, the reader further includes extraction unit configured to extract a highly reliable section of a character string including a partial character sting matched with the first reading format among the recognized character strings, wherein the second search processing unit searches a second reading format in which a character string matched with the first reading format matches as the partial character string and also is adaptable to a type of characters arranged in the highly reliable section.

Further, according to a portable optical reader according to a fourth invention, in any one of the first to third inventions, the reader further includes unit for setting a rectangular area expanded from a character area in an up and down, and left and right directions at a constant ratio every recognized character string, unit for calculating a ratio of white pixels in a set rectangular area, and unit for judging based on a calculated ratio whether there is a possibility of a reading error.

Further, according to a portable optical reader according to a fifth invention, in any one of the first to third inventions, the reader further includes unit for counting a number of pixels having a brightness value equal to or larger than a predetermined threshold in the character area every recognized character string, unit for calculating an evaluation value by calculating a ratio of a counted number of pixels to an entire number of pixels, and unit for judging based on the calculated evaluation value whether there is a possibility of a reading error.

Further, according to a portable optical reader according to a sixth invention, in any one of the first to third inventions, the reader further includes unit for extracting a pixel having a brightness value equal to or larger than a predetermined threshold in the character area every character of a recognized character string, unit for extracting a pixel having a brightness value equal to or larger than a predetermined threshold in the character area every character of a recognized character string, unit for calculating a maximum consecutive number of extracted pixels in a vertical direction or in a lateral direction, and unit for judging based on the calculated maximum consecutive number whether there is a possibility of a reading error.

Further, according to a portable optical reader according to a seventh invention, in any one of the first to third inventions, the reader further includes unit for calculating a distribution histogram of a brightness value about the recognized character area, and unit for calculating an evaluation value based on the calculated distribution histogram, unit for judging based on the calculated evaluation value whether there is a possibility of a reading error every character.

The portable optical reader according to an eighth invention, wherein the unit for judging whether there is a possibility of a reading error calculates an overall evaluation value in which a plurality of evaluation values calculated in the portable optical reader according to any one of fifth to seventh inventions are integrated, and judges a possibility of a reading error every character based on the overall evaluation value.

Further, the portable optical reader according to a ninth invention, in any one of first to third inventions, wherein the notification unit notifies a possibility of a reading error when the first search processing unit searched a plurality of matched first reading formats.

Further, the portable optical reader according to a tenth invention, in any one of first to ninth inventions, the reader further includes display unit for displaying a read character string and displaying an updatable screen when the notification unit notifies a possibility of a reading error.

Further, the portable optical reader according to an eleventh invention, in any one of first to third inventions, in the first search processing unit, when no matched first reading format is searched, the notification unit notifies that the imaging unit images again to execute the processing.

Next, in order to attain the aforementioned object, the optical reading method according to a twelfth invention is capable of being executed by a portable optical reader equipped with imaging unit for imaging a character string as a reading target, character string recognition unit for recognizing a character string based on an image captured by the imaging unit, and reading format storage unit for storing a plurality of reading formats defining an attribute of the character string, wherein the portable optical reader includes a first process for searching a first reading format matched with a character string recognized by the character string recognition unit among a plurality of stored reading formats, a second process for searching a second reading format in which a character string matched with the first reading format among a plurality of stored reading formats matches as a partial character string, and a third process for notifying a possibility of a reading error regarding the recognized character string based on a search result of the second search processing unit.

Next, in order to attain the aforementioned object, a computer program according to a thirteenth invention is capable of being executed by a portable optical reader equipped with imaging unit for imaging a character string as a reading target, character string recognition unit for recognizing a character string based on an image captured by the imaging unit, and reading format storage unit for storing a plurality of reading formats defining an attribute of the character string, wherein the computer program makes the portable optical reader function as first processing unit for searching a first reading format matched with a character string recognized by the character string recognition unit among a plurality of stored reading formats, second processing unit for searching a second reading format in which a character string matched with the first reading format among a plurality of stored reading formats matches as a partial character string, and notification unit for notifying a possibility of a reading error regarding the recognized character string based on a search result of the second search processing unit.

In the first invention, the twelfth invention, and the thirteenth invention, a character string as a reading target is captured, and based on the captured image, the character string is recognized. A plurality of reading formats defining an attribute of the character string is stored, and a first reading format matched with the recognized character string is searched among a plurality of stored reading formats. Among the plurality of stored reading formats, a second reading format in which the character string matched with the first reading format matches as a partial character string is searched, and based on the search result, the possibility of a reading error regarding the recognized character string is notified. With this, in cases where the possibility that a reading error was performed by digit drop is high, the possibility that a reading error was performed by generation of halation, etc., is high, it becomes possible to urge a user to perform confirmation, which can maintain the reading accuracy at a high level, and it is possible to improve the convenience of the reader. Further, in the recognition processing based on a matching degree or a mismatching degree, even in cases where the possibility that a reading error was performed cannot be judged, it becomes possible to prevent a reading error and more assuredly judge whether a reading is performed correctly.

In the second invention, when the matched second reading format is searched, it is notified that there is a possibility of a reading error. With this, it becomes possible to know a possibility that a character string exists outside the range of the first reading format, which makes it possible to judge that the possibility that a reading error was performed by digit drop and notify a user of the possibility.

In the third invention, amount the recognized character strings, a highly reliable section of a character sting including the partial character sting matched with the first reading format is extracted, and a second reading format in which the character string matched with the first reading format matches as a partial character string and is adaptable to a type of characters arranged in the highly reliable section is searched. That is, the highly reliable section existing in a section matched with the first reading format and its left and right sides is extracted, a second reading format matched with a character string in which a character string existing area having a predetermined number is added at least one of the left and right sides of the character string of the extracted section is searched. With this, since the high and low reading reliabilities exist even outside the reading format, it becomes possible to assuredly notify a user of the possibility of digit drop.

In the fourth invention, every recognized character string, a rectangular area expanded from the character area in an up and down, and left and right directions at a constant ratio is set, and the white pixel ratio of the set rectangular area is calculated. Based on the calculated ratio, it is judged whether reading was performed erroneously. With this, in cases where the so-called overexposed area due to generation of halation is equal to or larger a certain ratio, it becomes possible to judge that the possibility of a reading error is high and notifies a user.

In the fifth invention, every recognized character string, the number of pixels in the character area having a brightness value equal to or larger than a predetermined threshold is counted, and a ratio of the counted number of pixels to the entire number of pixels is calculated to calculate an evaluation value. Then, based on the calculated evaluation value, it is judged whether reading was performed erroneously. With this, in cases where the so-called overexposed area due to generation of halation is equal to or larger than a certain size, when the possibility that reading was performed erroneously based on the number of overexposed pixel evaluation value, it becomes possible to notify a user.

In the sixth invention, every character of the recognized character string, pixels having a brightness value equal to or larger than a predetermined threshold in the character area is extracted, and the maximum consecutive number of the extracted pixels in the vertical direction or horizontal direction is calculated. Based on the calculated maximum consecutive number, it is judged whether reading was performed erroneously. With this, in cases where the so-called overexposed area due to generation of halation is equal to or larger than a certain size, it becomes possible to judge that the possibility of a reading error is high and notify a user.

In the seventh invention, about the recognized character area, the distribution histogram of the brightness value is calculated, and the evaluation value is calculated based on the calculated distribution histogram. Based on the calculated evaluation value, it is judged whether there is a possibility of a reading error every character. With this, it is possible to evaluate the possibility of existence of characters from the histogram distribution of brightness values, and depending on the area of the histogram waveform, when the possibility of a reading error is high, it becomes possible to notify a user.

In the eighth invention, the overall evaluation value in which a plurality of evaluation values calculated by the aforementioned portable optical reader is integrated is calculated, and based on the overall evaluation value, it is judged whether there is a possibility that a reading error was performed erroneously every character. With this, for example, from the maximum value of each evaluation value, it becomes possible to judge the high or low possibility of a reading error.

In the ninth invention, in cases where a plurality of matched first reading formats is searched, it is possible to notify that there is a possibility of a reading error. With this, it becomes possible to know there is a possibility that it matches a reading format different from the originally assumed reading format, which makes it possible to judge that the possibility of a reading error is high and notify a user of the possibility.

In the tenth invention, in cases where it is notified that there is a possibility of a reading error, the read character string is displayed and an updatable screen is displayed. With this, when the possibility of a reading error is high, it becomes possible to immediately confirm whether there is a possibility that a reading error was performed actually and correct at that time when there is a possibility of a reading error.

In the eleventh invention, in cases where no matched first reading format is searched, the imaging condition is changed and imaging is executed again to automatically redo the processing. With this, in order to show the read result to a user in a state in which the possibility of a reading error is sufficiently low, it is possible to save trouble such as confirmation and correction.

According to the present invention, in cases where it is judged that the possibility that a reading error was performed by digit drop is high, the possibility that a reading error was performed by generation of halation, etc., is high, it becomes possible to urge a user to perform confirmation, which can maintain the reading accuracy at a high level. At the same time, there is no need to urge a user to perform confirmation every time read processing is executed, which makes it possible to improve the convenience of the reader. Further, in the recognition processing based on matching degree or mismatching degree, even in cases where the possibility that a reading error was performed cannot be judged, it becomes possible to assuredly judge.

BRIEF DESCRIPTION OF THE DRAWINGS

FIG. 5 is an exemplification view of reading format search processing in the case of using coordinate information in addition to character string information.

FIG. 6 is an exemplification view of reading format search processing in the case of using coordinate information in addition to character string information.

FIG. 7 is an exemplification view in a state in which "indefinite" characters are added.

FIG. 8 is an exemplification view of search results of a matching degree with respect to a plurality of reading formats.

FIG. 11 is an exemplification view of a setting screen for setting whether a read character string is to be displayed.

FIG. 16 is an exemplification view of search results of a matching degree with respect to a plurality of reading formats.

FIG. 21 is an exemplification view of a method of judging a possibility of a reading error.

FIG. 25 is an exemplification view of a character string having a possibility of matching with a plurality of reading formats.

FIG. 26 is an exemplification view of a reading format.

FIGS. 27A and 27B are an exemplification view of a distribution histogram of a brightness value of a recognized character string.

FIGS. 29A and 29 B are an exemplification view of a brightness value histogram of a handy terminal according to Embodiment 6 of the present invention.

FIG. 30 is an exemplification view in the case of calculating an overall evaluation value in a comprehensive manner.

DETAILED DESCRIPTION OF PREFERRED EMBODIMENT

Hereinafter, a portable optical reader according to an embodiment of the present invention will be explained in detail based on drawings. In this embodiment, a portable optical reader will be explained by exemplifying a case in which a handy terminal with a built-in CPU is employed.

Figure 1:
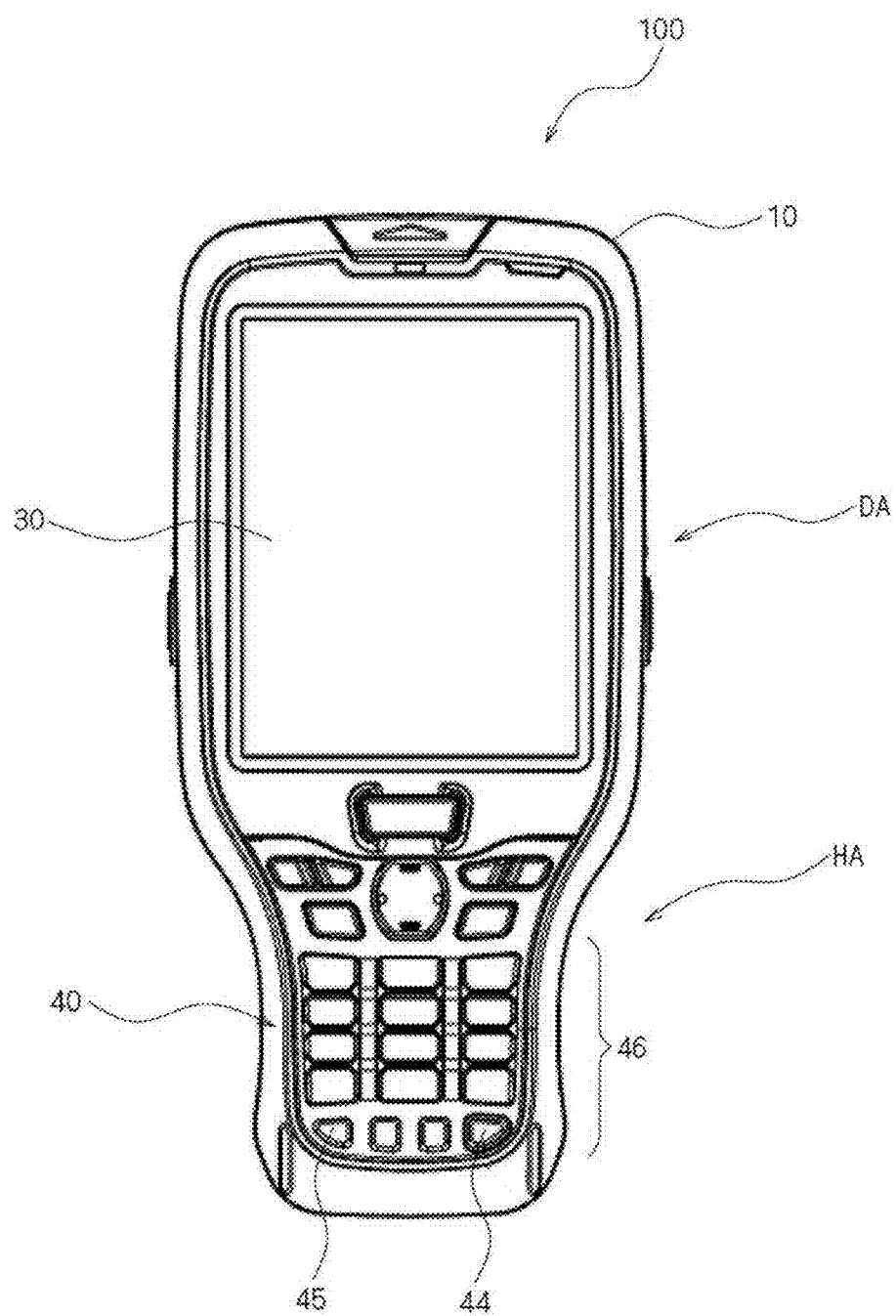
FIG. 1 is a schematic view showing an external structure of a handy terminal according to an embodiment of the present invention.

FIG. 1 is a schematic view showing an external structure of a handy terminal according to an embodiment of the present invention. As shown in FIG. 1, the handy terminal 100 is a plate-shape in which the external shape of the housing 10 of an appropriately rectangular shape is extended in one direction. At the tip end part or the rear part of the housing 10, a reading part (not illustrated) for performing optical reading of a symbol as a reading target is provided. The reading part is constituted by a scanning module for reading a bar code, a camera module for reading a two-dimensional code, etc.

On the upper surface of the housing 10, a display section (display part) 30 and a key arrangement part 40 are provided. The display part 30 is provided on one end side of the housing 10 and the key arrangement part 40 is provided on the opposite other end side thereof.

The housing 10 includes a display section DA having the display part 30 and a holding section HA having the key arrangement part 40. A user holds the holding section HA with his/her hand and operates each operation key 46 of the key arrangement part 40 arranged on the surface side of the holding section HA while referring to the displayed contents of the display part 30 provided in the display section DA. The housing 10 is formed such that, in a plan view, the display section DA is formed to be wide in width and the holding section HA is formed to be narrow in width, while, in a side view, the holding section HA is formed to be thick. This facilitates handing of the holding section HA.

The display part 30 is provided on one surface side of the housing 10, and displays various information such as an image of a symbol as a reading target captured by a camera section, information of a decoded symbol, another setting information. The display part 30 is constituted by, for example, a liquid crystal display (LCD), an organic EL, etc. Further, the display part 30 may be constituted by a touch panel.

In the key arrangement part 40, a plurality of operation keys 46, such as a numerical keypad, a power source key 44, and a function key 45, which perform various operations, are arranged. Each input device arranged in the key arrangement part 40 constitutes a key input part for receiving various input operations. Further, the touch panel of the display part 30 also functions as a key input part.

Further, the handy terminal 100 is equipped with a battery (not illustrated) for supplying driving power to secure the portability. Further, a sighting light irradiation part for irradiating sighting light for specifying an imaging position and an imaging part are arranged on a rear surface side of the housing 10.

Figure 2:
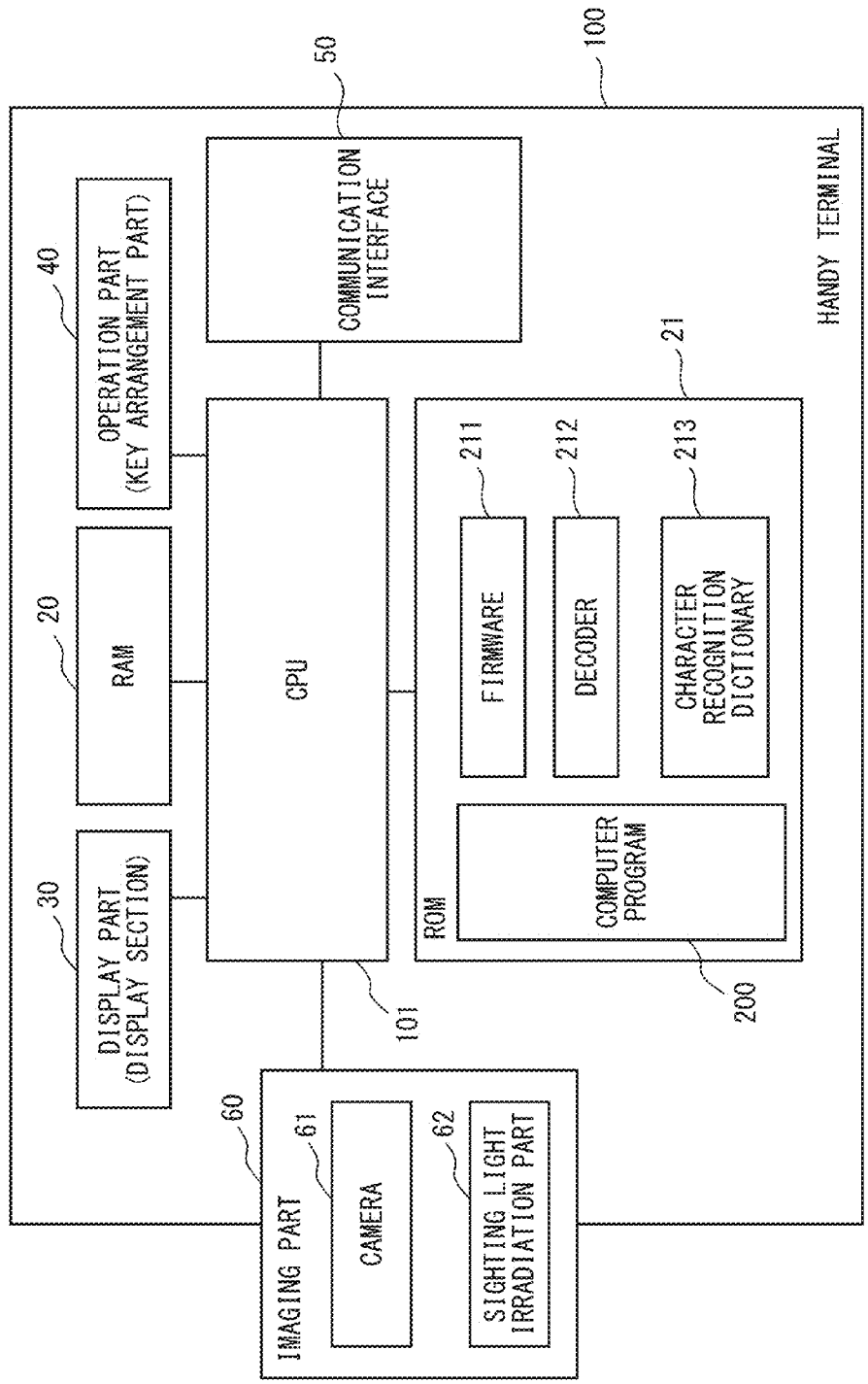
FIG. 2 is a block diagram showing a structure of the handy terminal according to the embodiment of the present invention in the case of using a control section such as a CPU, etc.

FIG. 2 is a block diagram showing a structure of the handy terminal 100 according to an embodiment of the present invention in the case in which a control section, such as a CPU, etc., is used. As shown in FIG. 2, the handy terminal 100 according to the embodiment is equipped with a CPU (control section) 101 for executing a control program which controls at least operations, a RAM 20, a ROM 21, a display part (display section) 30, an operation part (key arrangement part) 40, a communication interface 50, and an imaging part 60.

The CPU 101 is connected to each part of the aforementioned hardware of the handy terminal 100 via internal buses, etc., and controls the operation of each part of the aforementioned hardware and executes various software functions in accordance with the computer program 200 stored in the ROM 21. The RAM 20 is constituted by a volatile memory such as a SRAM, a SDRAM, etc., and a load module is developed thereon at the time of executing the computer program 200. The RAM 20 stores temporary data, etc., generated at the time of executing the computer program 200.

In the ROM 21, a firmware 211, a decoder 212, and a character recognition dictionary 213 are also stored. The firmware 211 is a program group such as a driver software, etc., for controlling the operation of each connected hardware. The decoder 212 decodes, for example, a QR code (registered trademark) or a bar code. The character recognition dictionary 213 is a dictionary for converting a captured image into text data.

The communication interface 50 is connected to an internal bus and is capable of executing data transmission/reception with an external computer, etc., by being connected to external networks such as the internet, LAN, WAN, etc. The operation part (key arrangement part) 40 receives inputs for operations by key inputs.

The imaging part 60 is constituted by a camera 61 and a sighting light irradiation part 62. The camera 61 is not specifically limited as long as the camera is an imaging unit, such as a VVD camera, etc., capable of imaging an imaging target. Further, the sighting light irradiation part 62 irradiates linear light extending in a horizontal direction of the image captured so that the imaging position can be visually recognized, light forming a cross shape in a direction perpendicular to the horizontal direction, or the like.

Figure 3:
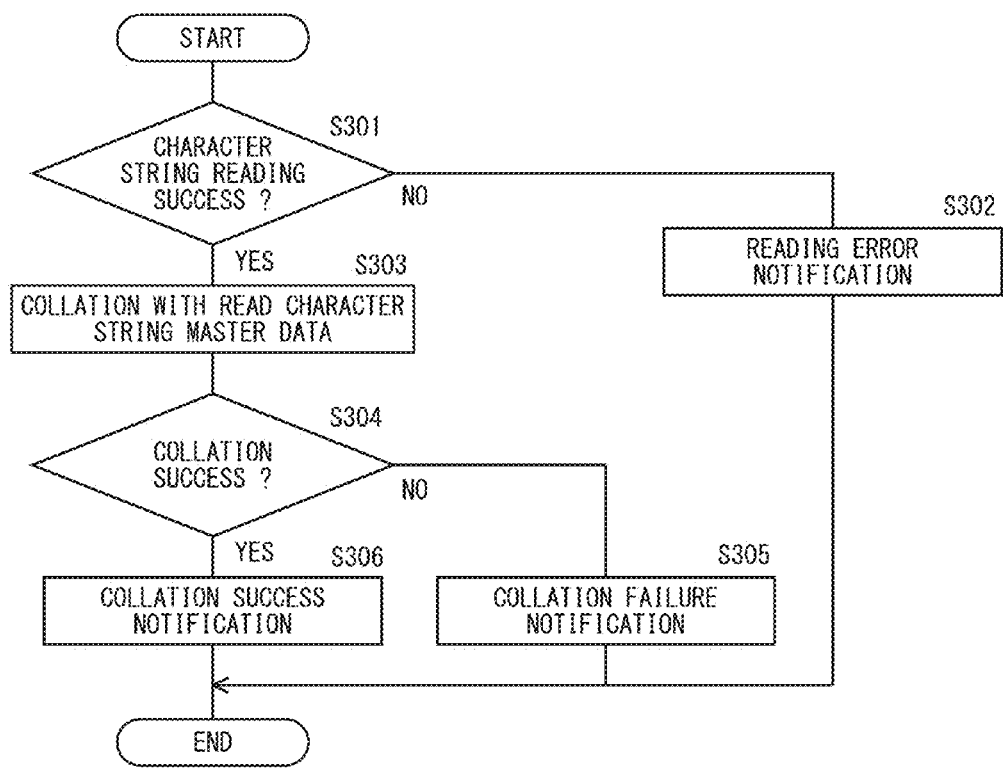
FIG. 3 is a flowchart showing a read processing procedure of the handy terminal according to the embodiment of the present invention.

The read processing procedure of the handy terminal 100 according to this embodiment is as follows. FIG. 3 is a flowchart showing the read processing procedure of the handy terminal 100 according to the embodiment of the present invention.

In FIG. 3, the CPU 101 of the handy terminal 100 of this embodiment judges whether reading of a character string was successfully performed (Step S301). "Reading was successfully performed" means a state in which it can be judged that any character string was recognized. After the successful reading, additional processing, such as storing the recognized character string as it is, executing collation processing for collating the recognized character string with master data, etc., can be considered. When the CPU 101 judges that reading of a character string was failed (Step S301: NO), the CPU 101 notifies the fact that reading was failed (Step S302).

When the CPU 101 judges that reading of a character string was successfully performed (Step S301: YES), the CPU 101 collates the read character string with master data (Step S303) and judges whether the collation was successfully performed (Step S304). "Collation was successfully performed" means that characters matching with the master data exist.

When the CPU 101 judges that the collation was failed (Step S304: NO), the CPU 101 notifies the fact that the collation was failed (Step S305). When the CPU 101 judges that the collation was successfully performed (Step S304: YES), the CPU 101 notifies the fact that the collation was successfully performed (Step S306). In this state, the reading by the handy terminal 100 was normally completed.

As the collation processing, various variations can be considered. For example, in the case of collating whether a character string matches with the master data, character strings are stored as master data, and when there is a character string matching with the read character string in the master data, it can be judged that the collation was successfully performed.

Alternatively, it can be configured such that data information, e.g., "2014/02/20," etc., is stored as master data and it is collated whether the read character string matches as date. In this case, the read character string is interpreted not as a simple character string but as date information. Therefore, for example, even in cases where the read character string is "14.2.20," by setting such that the character string is interpreted as "2014/02/20" as date, it can be judged that the collation was successfully performed that the read character string collates with the master data.

Further, it can be configured such that date information range, e.g., "2014/02/20 to 2014/03/20," etc., is stored as master data and it is collated whether the read character string matches as date within this range. In this case, even if the read character string is "14.2.25," it is within the range storing in the master data as date, and therefore it can be judged that the collation was successfully performed.

Embodiment 1

Figure 4:
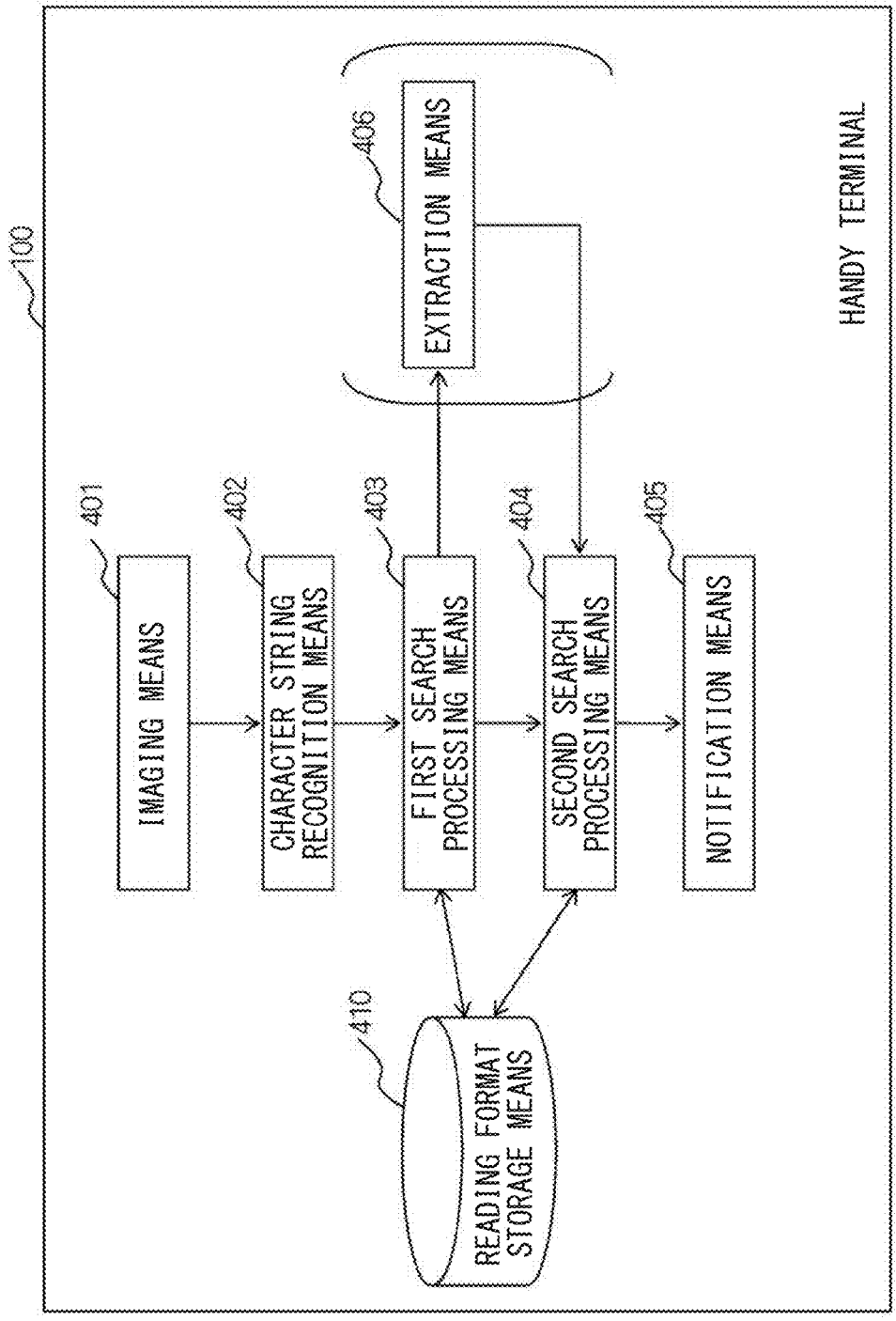
FIG. 4 is a function block diagram of the handy terminal according to the embodiment of the present invention.

FIG. 4 is a function block diagram of the handy terminal 100 according to Embodiment 1 of the present invention. The imaging unit 401 of the handy terminal 100 according to this Embodiment 1 images a reading target, such as, a character string, a QR code (registered trademark), a bar code, etc.

The character string recognition unit 402 recognizes a character string based on the captured image. The first search processing unit 403 judges whether the recognized character string matches with a reading format defining the attribute of the character string, and searches the matched reading format. A plurality of reading formats are stored in the reading format storage section 410 of the ROM 21.

The first search processing unit 403 searches a first reading format matching with the character string recognized by the character string recognition unit 402 among a plurality of reading formats stored. Concretely, the first search processing unit 403 searches a reading format matching with the character recognition result among a plurality of stored reading formats. When there is a matched reading format, the first search processing unit outputs "matching" information together with the matched reading format. When there is no matched format, the first search processing unit outputs "mismatching" information. When there are a plurality of matched reading formats, the first search processing unit outputs an optimal reading format such as a reading format that is longest in character string length, etc., in accordance with predetermined criteria.

The reading format can be a format of "3-digit to 8-digit numerals" or also can be a format of a regular expression. Further, the reading format can be a format that accepts only numerical numbers capable of being interpreted as a year-month-day like "YYYY.MM.DD."

Further, a "matching" information or a "mismatching" information can be output using coordinate information in addition to character string information. FIGS. 5 and 6 each are an exemplification view of reading format search processing in the case of using coordinate information in addition to character string information.

In the example shown in FIG. 5, the character string matches with the reading format of "YYYYMMDD," and also matches with the reading format of "YYYYMM." In this case, in order to employ the reading format of "YYYYMMDD," it can be judged to be mismatching by recognizing that the space between "MM" and "DD" is excessive and judged to be matching with the reading format of "YYYYMM" based on the coordinate information, and a search result (optimal reading format) can be output.

In the example shown in FIG. 6, based on the coordinate information, the character height is detected. Based on the change of the character height, it can be judged such that it does not match with the reading format of "YYYYMMDD" but matches with the reading format of "YYYYMM."

Further, even in cases where a part of the character recognition result is considered to be an "indefinite" character, or character which is cut out as a character but lowest with respect to any characters in matching degree to the character recognition dictionary 213 of the ROM 21, when the "indefinite" character is regarded as a wildcard and judged to be matched with the reading format, a result of "ambiguously matched" as a new concept can be returned.

Returning to FIG. 4, the second search processing unit 404 searches a second reading format that the character string matched with the first reading format matches as a partial string character string among a plurality of stored reading formats. With this, the possibility of digit drop at the time of recognizing the character string can be detected.

Concretely, assuming that a part of characters of a reading target exists outside an imaging screen, "indefinite" characters of a predetermined number are added to the left and right of the character recognition result recognized as a partial character string matched with the first reading format, and a matched reading format is searched again.

Here, the adding number is preferably a number large enough to the number of characters assumed by the optical reader. For example, in cases where the maximum readable digit number is 30 digits, 29 "indefinite" characters are respectively added on the left and right side of the character string.

Further, in the case of using coordinate information together, the adding "indefinite" character can be added at any arbitrary position outside the screen in an arbitrary size. Therefore, as to the reading format having a possibility of matching, it can be set to "ambiguously matched." FIG. 7 is an exemplification view showing a state in which "indefinite" characters are added.

In the state shown in FIG. 7, for example, as reading formats, four formats including "YYYY.MM", "YYYY.M", "YYYY.MM.DD", and "3-digit English letters" were prepared, and the judged results whether it matches are shown in FIG. 8.

FIG. 8 is an exemplification view of search results of a matching degree with respect to a plurality of reading formats. The aforementioned reading formats are respectively denoted as reading formats 1, 2, 3, and 4, and the matched portions, the matched results, the matched character strings are shown.

In the case in which (1) the matched result is "ambiguously matched" and (2) the character string matched with the first reading format searched by the first search processing unit 403 is included as a partial character string, it is judged that the possibility of occurrence of digit drop is high. As a matter of course, in cases where it is known beforehand that the reading target is date, when the meaning of date is changed, it is judged that the possibility of occurrence of digit drop is high.

When this condition is applied to the example of the search results shown in FIG. 8, it can be judged that the possibility of occurrence of digit drop on the reading format 3, i.e., "YYYY.MM.DD" is high.

Returning to FIG. 4, the notification unit 405 notifies the presence/absence of the possibility of a reading error regarding the recognized character string based on the search results of the second search processing unit 404. That is, in cases where the second reading format matched in the second search processing unit 404 is searched, it is preferable to notify that there is a possibility of a reading error.

The notification method is not specifically limited. For example, it can be configured such that a plurality of LED lights that emit red light are provided and the number of LED lights to be turned on increases as the possibility of a reading error becomes higher. Alternatively, it can be configured to change an emitting sound when the possibility of a reading error exceeds a predetermined threshold.

Figure 9:
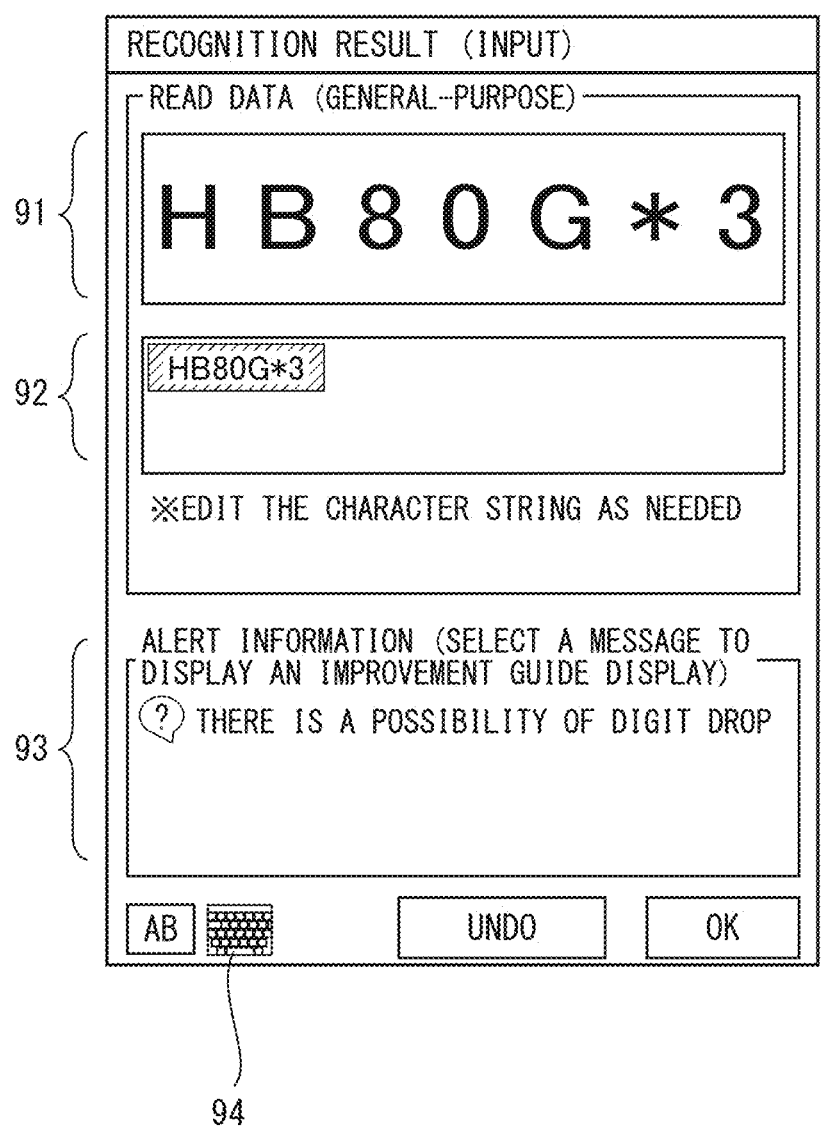
FIG. 9 is an exemplification view of a recognition/update screen to be displayed on a display part of a handy terminal according to Embodiment 1 of the present invention.
Figure 10:
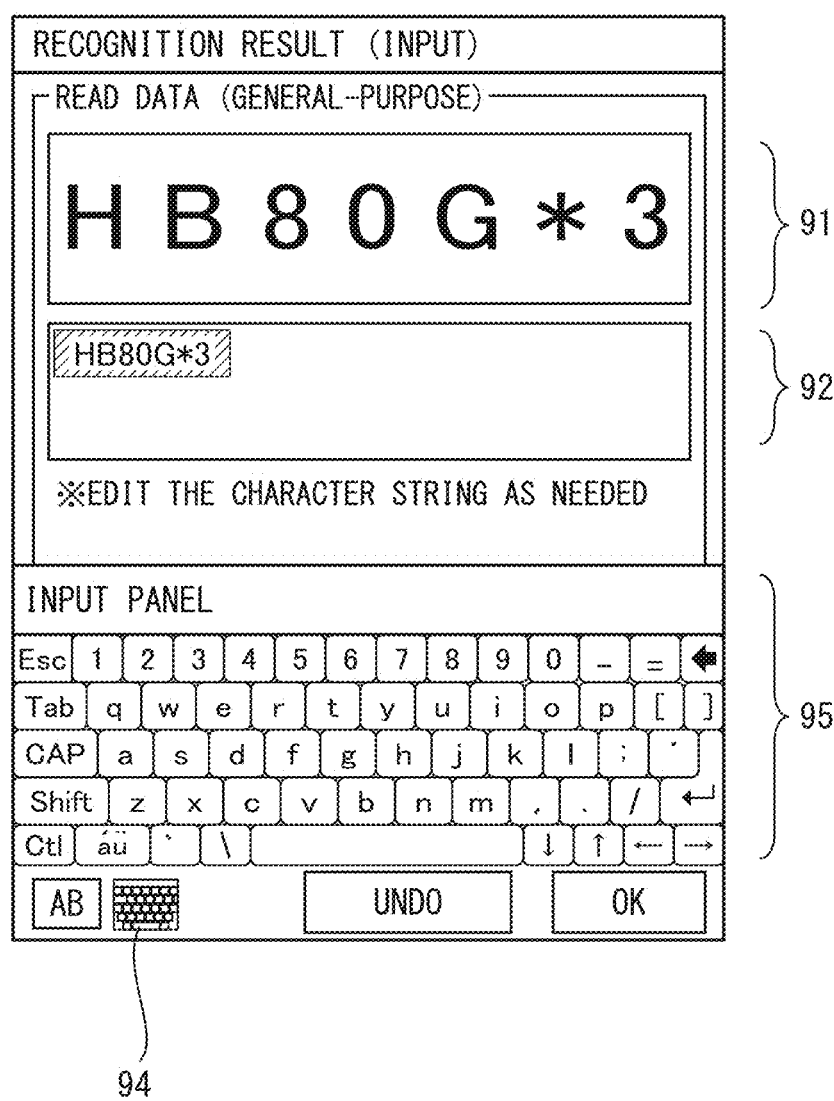
FIG. 10 is an exemplification view of a recognition/update screen to be displayed on a display part of the handy terminal according to Embodiment 1 of the present invention.

When the notification unit 405 notified that there is a possibility of a reading error, the display part 30 displays the read character string and also displays an updatable screen. FIGS. 9 and 10 each are an exemplification view of a recognition/update screen displayed on the display part 30 of the handy terminal 100 according to Embodiment 1 of the present invention.

FIG. 9 is an exemplification view of a screen displaying a read character string when a possibility of a reading error is notified by the notification unit 405. The read text data is displayed in the editing area 92 immediately below the image display area 91 in which the captured image is displayed, and a message of "there is a possibility of a digit drop" is displayed in the message display area 93.

FIG. 10 is an exemplification view of a screen for editing a displayed character string when a possibility of a reading error is notified by the notification unit 405. When the keyboard icon 94 is clicked to edit the text data displayed in the editing area 92, an editing virtual keyboard 95 is pop-up displayed, so that the text data displayed in the editing area 92 can be edited.

As a matter of course, a user designation can be accepted so as to not display the read state. FIG. 11 is an exemplification view of a setting screen for setting whether a read character string is to be displayed. In the example of FIG. 11, a selection pop-up 101 which accepts a selection among three options, i.e., displaying every reading (every time), not displaying, and displaying when notified (at the time of generating an alert) is displayed.

Figure 12:
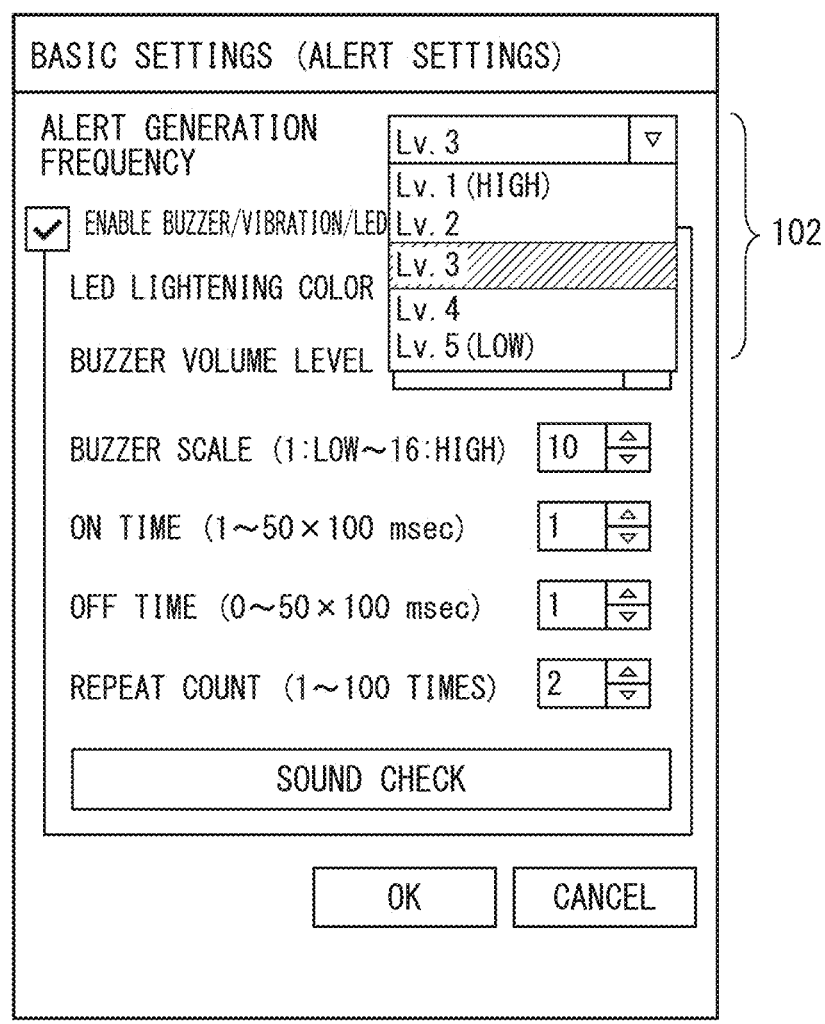
FIG. 12 is an exemplification view of a changing screen of a threshold as a notification standard.

Further, a threshold which is a criterion to judge whether a notification is performed can be changed. FIG. 12 is an exemplification view of a changing screen of a threshold as a notification criterion. In the example of FIG. 12, a frequency setting pop-up 102 which can receives settings of frequency of notification (alert) generation from levels 1 to 5 in a stepwise manner is displayed.

Figure 13:
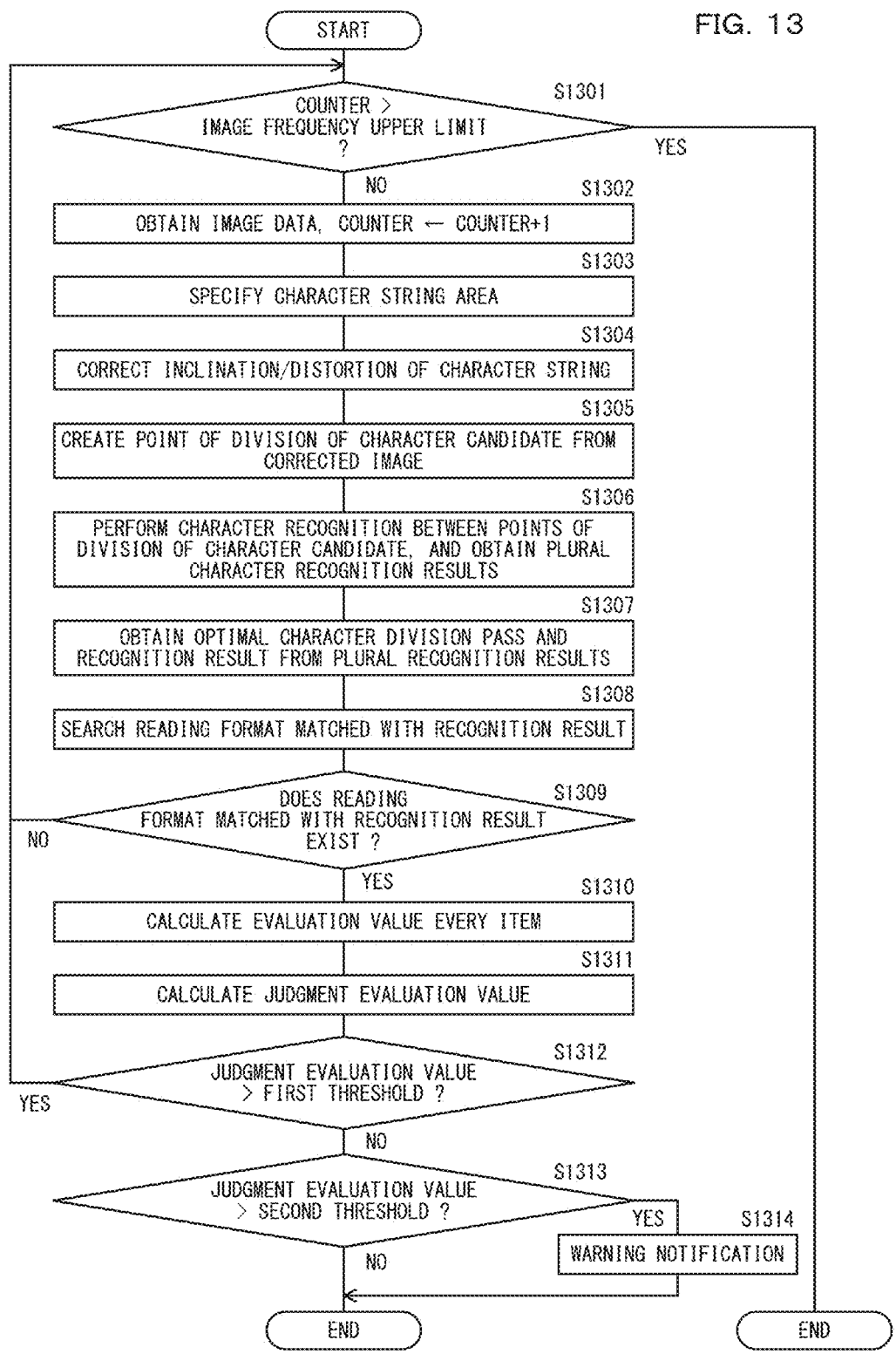
FIG. 13 is a flowchart showing a processing procedure of a CPU of the handy terminal according to Embodiment 1 of the present invention.

FIG. 13 is a flowchart showing a processing procedure of the CPU 101 of the handy terminal 100 according to Embodiment 1 of the present invention. The CPU 101 of the handy terminal 100 judges whether the counter has reached the upper limit of the imaging frequency (Step S1301). When the CPU 101 judges that the imaging frequency of the counter has reached the upper limit (Step S1301: YES), the CPU 101 terminates the processing assuming that the read processing was failed.

When the CPU 101 judges that the imaging frequency of the counter has not yet reached the upper limit (Step S1301: NO), the CPU 101 obtains the image data from the imaging unit 401 to increment the counter by '1' (Step S1302). The CPU 101 specifies a character area which is an area in which the character string exists (Step S1303).

The specification method of the character area is not specifically limited. For example, using a distribution histogram of a brightness value, an area in which a histogram waveform having protruded portions at regular intervals can be defined as the character area.

The CPU 101 corrects inclination and distortion of the character string in the character area (Step S1304) and creates a dividing point of the character candidate based on the corrected image (Step S1305). The CPU 101 obtains a plurality of character recognition results by performing character recognition between the dividing points of the character candidate (Step S1306).

The CPU 101 obtains an appropriate character division pass and a character recognition result based on the character division pass based on a plurality of recognition results (Step S1307) and searches a reading format matched with the recognition result (Step S1308). The CPU 101 judges whether there is a reading format matched with the recognition result (Step S1309).

Figure 14:
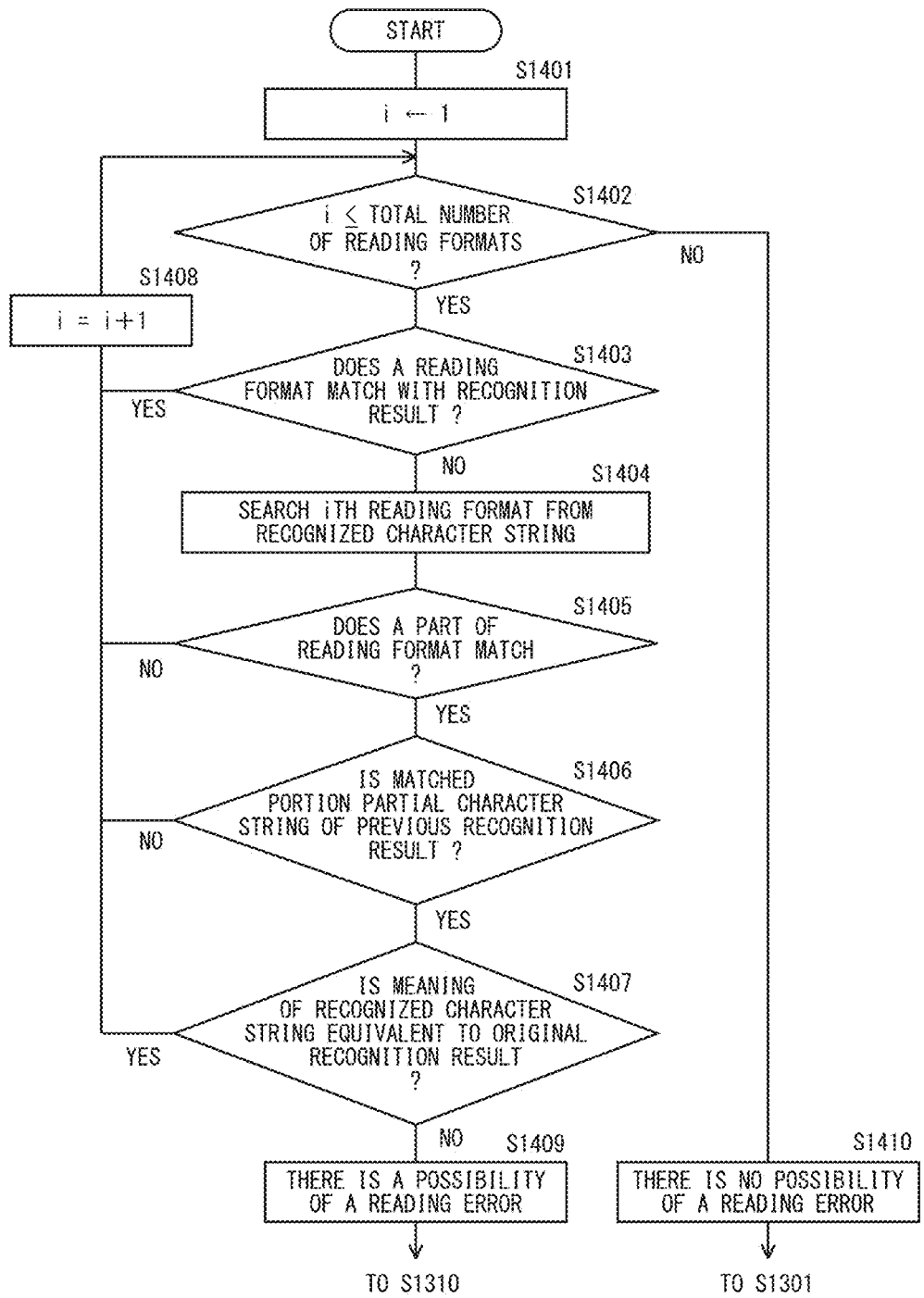
FIG. 14 is a flowchart showing a procedure of reading format search processing of a CPU of the handy terminal according to Embodiment 1 of the present invention.

Processing shown in Step S1308 and Step S1309 will be explained in detail. FIG. 14 is a flowchart showing a reading format search processing procedure of the CPU 101 of the handy terminal 100 according to Embodiment 1 of the present invention.

In FIG. 14, the CPU 101 of the handy terminal 100 sets the counter i to '1' (Step S1401), and judges whether the counter i is equal to or smaller than a total number of stored reading formats (Step S1402). When the CPU 101 judges that the counter i is larger than the total number of stored reading formats (Step S1402: NO), the CPU 101 judges that there is no possibility of wrong reading (Step S1410), and returns the processing to Step S1301 to repeat the aforementioned processing.

When the CPU 101 judges that the counter i is equal to or smaller than the total number of stored reading formats (Step S1402: YES), the CPU 101 judges whether the $i^{th}$ reading format is a reading format matched with the recognition result (Step S1403: first search processing unit). When the CPU 101 judges that $i^{th}$ reading format is a reading format matched with the recognition result (Step S1403: YES), the CPU 101 increments the counter i by '1' (Step S1408), and returns the processing to Step S1402 to repeat the aforementioned processing.

When the CPU 101 judges that it is not a reading format matched with the recognition result (Step S1403: NO), the CPU 101 searches the $i^{th}$ reading format from the recognized character string (Step S1404) and judges whether a part of the searched reading format matches (Step S1405). When the CPU 101 judges that the searched reading format is not matched (Step S1405: NO), the CPU 101 increments the counter i by '1' (Step S1408), and returns the processing to Step S1402 to repeat the aforementioned processing.

When the CPU 101 judges that a part of the searched reading format matches (Step S1405: YES), the CPU 101 judges whether the matched portion is a partial reading string of the previous recognition result (Step S1406: second search processing unit). When the CPU 101 judges that the matched portion is not a partial character string of the previous recognition result (Step S1406: NO), the CPU 101 increments the counter i by '1' (Step S1408), and returns the processing to Step S1402 to repeat the aforementioned processing.

When the CPU 101 judges that the matched portion is a partial character string of the previous recognition result (Step S1406: YES), the CPU 101 judges whether the meaning content of the recognized character string is equivalent to the meaning of the previous recognized character string (Step S1407). Here, "the meaning content of the recognized character string is equivalent to the meaning of the previous recognized character string" denotes the same meaning relationship between, e.g., "2014/12/20" and "14/12/20" when date is read. Other than this, for example when an address is read, " . . . , Yodogawa-ku, Osaka-shi, Osaka-fu" and " . . . , Yodogawa-ku" are the same in meaning, and therefore they are considered to be equivalent. Hereinafter, equivalent cases are stored in the ROM 21 in advance.

When the CPU 101 judges that the meaning content of the recognized character string is equivalent to the meaning of the original recognized character string (Step S1407: YES), the CPU 101 increments the counter i by '1' (Step S1408), and returns the processing to Step S1402 to repeat the aforementioned processing. When the CPU 101 judges that the meaning content of the recognized character string is not equivalent to the meaning of the previous recognized character string (Step S1407: NO), the CPU 101 judges that there is a possibility of wrong reading (Step S1409), and proceeds the processing to Step S1310.

Returning to FIG. 13, the CPU 101 calculates the evaluation value showing the possibility of a reading error every item according to a predetermined rule (Step S1310), and calculates a judgment evaluation value based on a plurality of calculated evaluation values (Step S1311). The judgment evaluation value may be, for example, a total value of a plurality of calculated evaluation value, or the maximum value. The CPU 101 judges whether the judgment evaluation value is larger than a first threshold judging a reading failure (Step S1312).

When the CPU 101 judges that the judgment evaluation value is larger than a first threshold judging a reading failure (Step S1312: YES), the CPU 101 returns the processing to Step S1301 to repeat the aforementioned processing. When the CPU 101 judges that the judgment evaluation value is equal to or smaller than a first threshold judging a reading failure (Step S1312: NO), the CPU 101 judges whether the judgment evaluation value is larger than a second threshold judging whether a warning is to be notified (Step S1313).

When the CPU 101 judges that the judgment evaluation value is larger than a second threshold judging whether a warning is to be notified (Step S1313: YES), the CPU 101 notifies a warning although the reading was successful (Step S1314). That is, a warning showing the possibility of a reading error is notified. When the CPU 101 judges that the judgment evaluation value is equal to or smaller than a second threshold judging whether a warning is to be notified (Step S1313: NO), the CPU 101 terminates the processing.

In cases where a plurality of matched reading formats (first reading formats) are searched in the first search processing unit 403, it can be configured to notify that there is a possibility of a reading error. With this, it becomes possible to know that there is a possibility that it matches with a reading format different from the originally assumed reading format. Therefore, this makes it possible to notify a user of the possibility that a reading error was performed is high.

Further, in cases where a matched first reading format is not searched by the first search processing unit 403, it can be configured to execute the processing by imaging again with the imaging unit 401. In this case, the imaging condition, such as a parameter like an exposure time, can be set again to a value that is different from a value set in the previous imaging. Then, after the processing of the flowchart (Step S1402: NO), the counter is initialized and the processing is returned to Step S1301 to repeat the aforementioned processing. With this, in cases where there is a possibility of an apparent reading error, it becomes possible to restart from imaging, enabling to save the effort of confirming to correct, etc. Further, even in the case of an image in which halation is occurring, an image in which blurring is generating, etc., a high quality image can be obtained by imaging again, which in turn can perform reading high in reliability.

According to Embodiment 1 mentioned above, only in cases where it is judged that the possibility that a reading error was performed by digit drop is high, the possibility that a reading error was performed by generation of halation, etc., is high, it is possible to urge a user to perform confirmation, which can maintain the high reading accuracy. At the same time, there is no need to urge a user to perform confirmation every time read processing is executed, which makes it possible to improve the convenience of the reader. Further, in the recognition processing based on matching degree or mismatching degree, the possibility of a reading error cannot be judged. But, it becomes possible to assuredly judge the possibility of a reading error according to Embodiment 1.

Embodiment 2

The structure of a handy terminal 100 and the function block diagram according to Embodiment 2 of the present invention is the same as in Embodiment 1, and therefore the detail explanation will be omitted by allotting the same symbol. Embodiment 2 differs from Embodiment 1 in that not only a digit drop occurred outside an imaged screen but also a digit drop occurred within the screen are detected.

As shown in FIG. 4, the first search processing unit 403 searches a first reading format matched with the character string recognized by the character string recognition unit 402 among a plurality of stored reading formats. Concretely, the first search processing unit 403 searches a reading format matched with the character recognition result among a plurality of stored reading formats. When there is a matched reading format, the first search processing unit outputs "matching" information together with the matched reading format. When there is no matched format, the first search processing unit outputs "mismatching" information. When there is a plurality of matched reading formats, the first search processing unit outputs an optimal reading format such as a reading format that is longest in character string length, etc., in accordance with a predetermined criterion.

The extraction unit 406 extracts a partial character string matched with the first reading format from the recognized character string. Further, it extracts a highly reliable section of a character sting including the partial character string matched with the first reading format. Here, "highly reliable section" means a combined section of a section of the partial character string matched with the first reading format and a section in which characters having a matching degree with the character recognition dictionary 213 higher than a threshold are continued on the left and right side of the section of the partial character string. The threshold for judging whether to be included in the highly reliable section can be the same as or different from a threshold for judging whether the recognition result is an "indefinite" character. FIG. 15 is an exemplification view of a highly reliable section in the handy terminal 100 according to Embodiment 2 of the present invention.

Figures 15A, 15B:
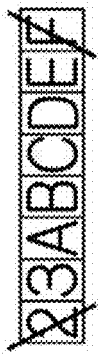
FIGS. 15A and 15B are an exemplification view of a highly reliable section in the handy terminal according to Embodiment 2 of the present invention.

FIG. 15 shows an example in which "3ABCD" can be read among the character string of "23ABCDEF" shown in FIG. 15(a) (see "recognition result" in FIG. 15(b)) and "ABCDE" matches with the first reading format. That is, the portion 151 matched with the first reading format is a partial character string corresponding to the first reading format of "5 English letter" among characters having a matching degree of 30 or more as an indefinite threshold which is indefinite in recognition result. In the left and right of the matched partial character string, only "3" has a matching degree equal to or larger than the threshold to be included. In detail, the matching degree of "3" is 80. This is a value equal to or larger than the matching degree of 70 which is a threshold (highly reliable threshold) for judging whether to be included in the highly reliable section 152. That is, the matching degree of "3" is 80 which is value equal to or larger than the matching degree of 70, and therefore a threshold (highly reliable threshold) for judging whether to be included in the highly reliable section 152 has been obtained. Accordingly, the highly reliable section is "3ABCDE."

Hereinafter, the second search processing unit 404 searches a second reading format in which the extracted character string in the highly reliable section matches as a partial character string. The second reading format to be searched is a reading format which is also adaptable to a type of characters arranged in the highly reliable section. Concretely, characters matched with a character string in the highly reliable section in which characters are added to at least one of left and right sides of the partial character string matched with the first reading format are searched. When there is a matched character, "matching" information is output. When there is no matched character, "mismatching" information is output. When there is a plurality of matched reading formats, an optimal reading format such as a reading format that is longest in character string length, etc., is output in accordance with a predetermined criterion.

Concretely, assuming that a part of characters of a reading target exists even in, for example, an imaging screen, "indefinite" characters of a predetermined number are added to the left and right sides of the extracted character string in the highly reliable section and a matched reading format is searched again.

For example, as reading formats, three reading formats of "4-digit English letters," "5-digit English letters," "6-digit English letters" were prepared, and the judged results whether it matches are shown in FIG. 16.

FIG. 16 is an exemplification view of search results of a matching degree with respect to a plurality of reading formats. The aforementioned reading formats are respectively denoted as reading formats "1," "2," and "3," and the matched portion, matched result, matched character string, and extending direction are described, respectively.

In cases where (1) the matched result is "ambiguously matched" and (2) the character string searched by the first search processing unit 403 and extracted in the first reading format is included as a partial character string, it is judged that the possibility of occurrence of digit drop is high even within a screen. As a matter of course, in cases where it is known beforehand that the reading target is date, when the meaning as date has changed, it is judged that the possibility of occurrence of digit drop is high.

As to respective reading formats meeting this condition, comparing with the original recognition result, the possibility that the character string is extended in one of left and right directions is judged. In the example shown in FIG. 16, the reading format "3," i.e., only the "6-digit English letters" satisfy the condition, and therefore it is understood that there is a possibility of occurrence of digit drop on the right side of the character string.

Hereinafter, as to the direction in which there is a possibility of occurrence of digit drop, by the method described in the following Embodiment, the possibility of occurrence of digit drop can be judged.

Figure 17:
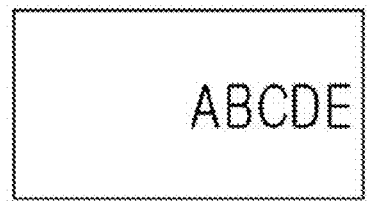
FIG. 17 is an exemplification view in a case where a character string exists on one side of the screen.

In cases where a character string exists in a manner so as to arrange on one end side of the screen, it can be judged that there is a possibility that digit drop occurred. FIG. 17 is an exemplification view in a case where a character string exists in a manner so as to arrange on one side of the screen.

As shown in FIG. 17, the character string "ABCDE" exists in a manner so as to arrange on the right side of the screen. In this case, based on two conditions that the character string of "ABCDE" matches with a partial character string of the reading format of "10-digit English letter" and the character string is located near the screen end, it is judged that there is a possibility of occurrence of digit drop.

According to Embodiment 2 mentioned above, in cases where the possibility that a reading error was performed by digit drop is high even within the screen, the possibility that a reading error was performed by generation of halation, etc., is high, it is possible to urge a user to perform confirmation, which can maintain the reading accuracy at a high level. At the same time, there is no need to urge a user to perform confirmation every time read processing is executed, which makes it possible to improve the convenience of the reader. Further, by using the right and left highly reliable section of the read character string for the judgment, the extension direction of the character string can be specified in the second search processing unit, which can reduce the frequency of erroneous detection of the possibility of digit drop.

Embodiment 3

The structure of a handy terminal 100 and the function block diagram according to Embodiment 3 of the present invention are the same as those of Embodiment 1, and therefore the detail explanation will be omitted by allotting the same symbol. This Embodiment 3 differs from Embodiments 1 and 2 in that the possibility of a reading error due to generation of halation is detected.

Figure 18:
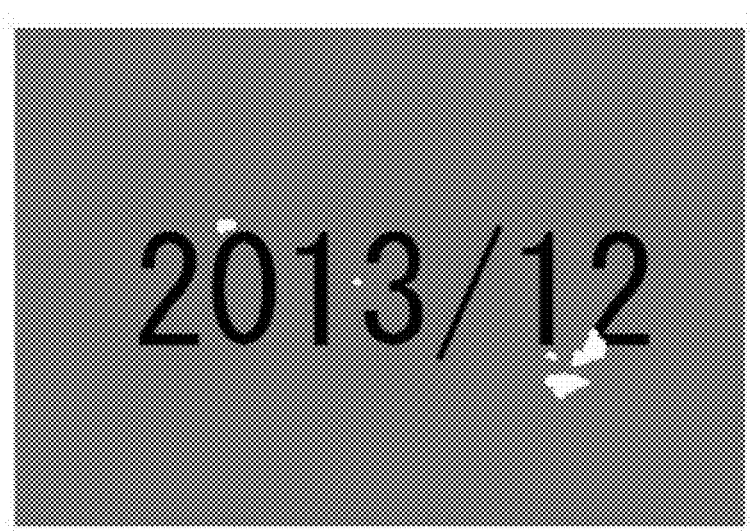
FIG. 18 is an exemplification view in a case where halation (overexposure) is occurring in a captured image.

FIG. 18 is an exemplification view in a case in which halation (overexposure) is generated in a captured image. As shown in FIG. 18, halation occurred at the lower section of the character "12" of the character string "2013/12" and the possibility of a reading error is high.

Therefore, in the handy terminal 100 according to Embodiment 3, every recognized character string, the number of pixels in the character area having a brightness value equal to or larger than a predetermined threshold is counted, and a rate of the counted number of pixels to the entire number of pixels is calculated to calculate an evaluation value. Then, based on the calculated evaluation value, it is judged whether there is a possibility of a reading error.

Figure 19:
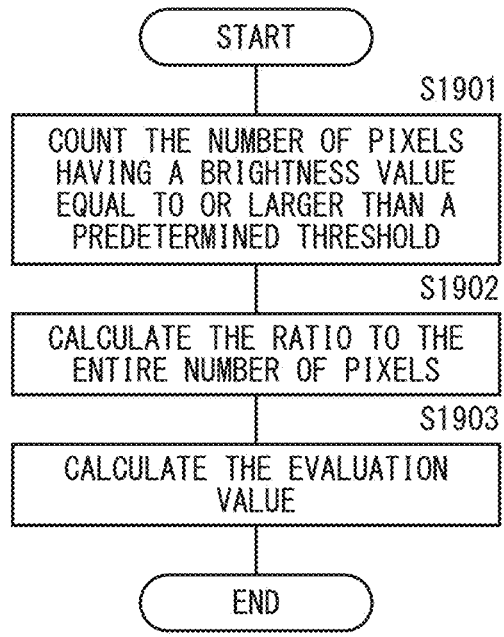
FIG. 19 is a flowchart showing a procedure of halation determination processing of a CPU of a handy terminal according to Embodiment 3 of the present invention.

FIG. 19 is a flowchart showing a halation determination processing procedure of a CPU 101 of a handy terminal 100 according to Embodiment 3 of the present invention. In FIG. 19, the CPU 101 of the handy terminal 100 counts the number of pixels in the character area having a brightness value equal to or larger than a predetermined threshold every recognized character string (Step S1901).

The CPU 101 calculates a rate of the counted number of pixels to the entire number of pixels (Step S1902) and calculates an evaluation value based on a predetermined rule (Step S1903). Based on the calculated evaluation value, the CPU 101 can judge whether there is a possibility of a reading error.

Needless to say, it is not limited to the rate of the number of pixels, and it can be judged by, for example, the maximum consecutive number of white pixels. In this case, the handy terminal 100 according to Embodiment 3 extracts pixels in the character area having a brightness value equal to or larger than a predetermined threshold every character of the recognized character string, and calculates the maximum consecutive number of the extracted pixels in the vertical direction or lateral direction. Then, based on the calculated maximum consecutive number, it is judged whether there is a possibility of a reading error.

Figure 20:
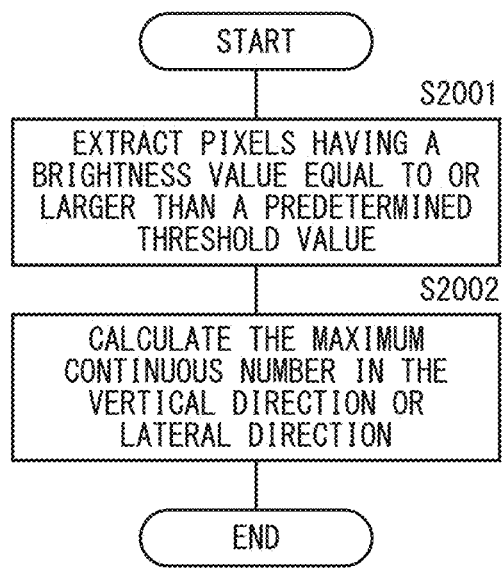
FIG. 20 is a flowchart showing another procedure of halation determination processing of a CPU of the handy terminal according to Embodiment 3 of the present invention.

FIG. 20 is a flowchart showing another procedure of a halation determination processing of the CPU 101 of the handy terminal 100 according to Embodiment 3 of the present invention. In FIG. 20, the CPU 101 of the handy terminal 100 extracts pixels in the character area having a brightness value equal to or larger than a predetermined threshold every character of the recognized character string (Step S2001). The CPU 101 calculates the maximum consecutive number of the extracted pixels in the vertical direction or lateral direction (Step S2002). Based on the calculated maximum consecutive number, the CPU 101 can judge whether there is a possibility of a reading error.

FIG. 21 is an exemplification view of a method of judging a possibility of a reading error. In FIG. 21, every character of the character string shown in FIG. 18, the evaluation value is calculated in accordance with the procedure of the determination processing shown in FIG. 19 or FIG. 20. That is, the while pixel rate is calculated every character to calculate the evaluation value A. In the same manner, the consecutive number of while pixels is calculated every character to calculate an evaluation value B.

Then, a larger value of the evaluation value A and the evaluation value B is regarded as an overall evaluation value. The maximum value among the overall evaluation values is regarded as an evaluation value of the entire character string.

Figure 22:
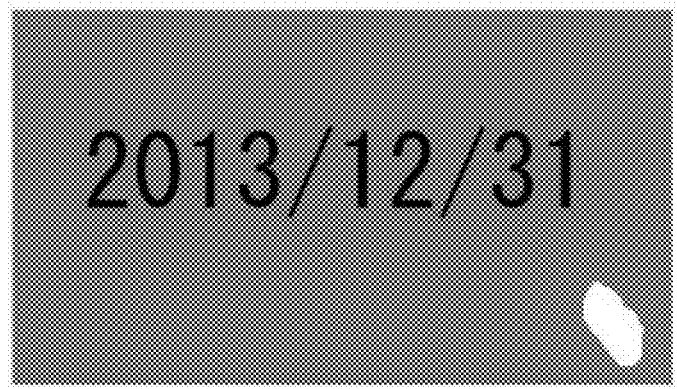
FIG. 22 is an exemplification view in a case where halation that no warning is to be issued is occurring in the handy terminal according to Embodiment 3 of the present invention.

With this, it is possible to notify the possibility of a reading error due to generation of halation (overexposure) occurred near the character string. FIG. 22 is an exemplification view in a case in which halation causing no notification of a warning is occurring in the handy terminal 100 according to Embodiment 3 of the present invention. That is, as shown in FIG. 22, in cases where halation occurred in a portion nothing to do with the recognized character string, no warning is notified. Therefore, a warding indicating the possibility of a reading error is not frequently notified.

Figure 23:
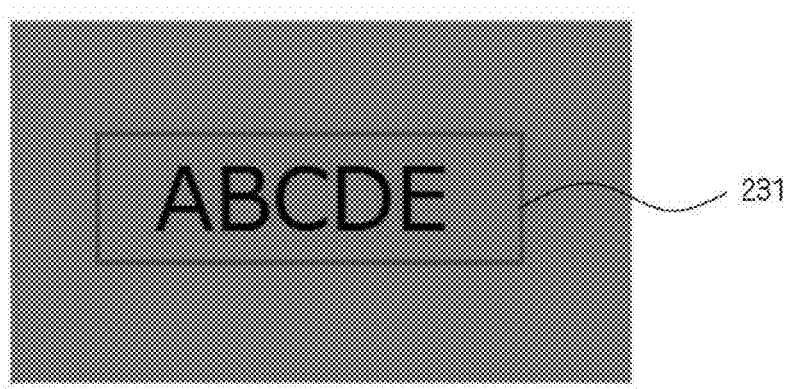
FIG. 23 is an exemplification view of a rectangular area.

The possibility of occurrence of halation can be judged based on the rate of white pixels in a rectangular area expanded from the range of the character-recognized character string in the up and down and left and right directions at a constant rate. FIG. 23 is an exemplification view of the rectangular area. In the example of FIG. 23, a rectangular area 231 expanded from the range of the character string "ABCDE" in the up and down, and left and right directions at a constant rate is set. In cases where the ratio of white pixels in the rectangular area 231 is larger than a predetermined value, it is judged that halation occurred and therefore it is judged that the possibility of a reading error is high.

Figure 24:
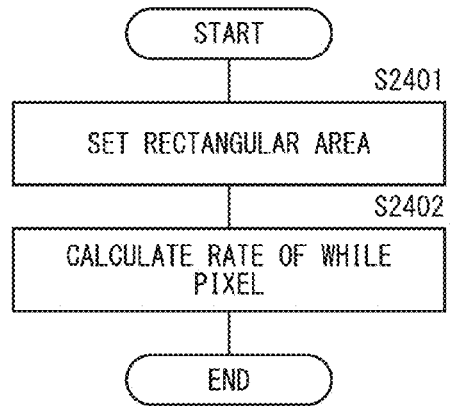
FIG. 24 is a flowchart showing another procedure of halation determination processing of the CPU of the handy terminal according to Embodiment 3 of the present invention.

FIG. 24 is a flowchart showing another procedure of halation determination processing of the CPU 101 of the handy terminal 100 according to Embodiment 3 of the present invention. In FIG. 24, the CPU 101 of the handy terminal 100 sets a rectangular area expanded from the character area in the up and down, and left and right directions at a constant rate every recognized character string (Step S2401). The CPU 101 calculates the ratio of white pixels in the set rectangular area (Step S2402). Then, based on the calculated ratio, it is judged whether there is a possibility of a reading error.

Needless to say, whether the ratio of white pixels has exceeded a predetermined value can be judged at a character string unit, or by comparing in the same manner as in the evaluation value of a character unit shown in FIG. 21, an overall evaluation value can be calculated at a character string unit as a whole. That is, by integrating the entire evaluation values, it can be calculated as an overall evaluation value.

As explained above, according to Embodiment 3, in cases where the possibility that a reading error was performed by generation of halation is high, etc., it is possible to urge a user to perform confirmation, which can maintain the reading accuracy at a high level. At the same time, there is no need to urge a user to perform confirmation every time read processing is executed, which makes it possible to improve the convenience of the reader.

Embodiment 4

The structure of a handy terminal 100 and the function block diagram according to Embodiment 4 of the present invention is the same as in Embodiment 1, and therefore the detail explanation will be omitted by allotting the same symbol. Embodiment 4 differs from Embodiments 1 to 3 in that a plurality of matched first reading formats are searched in the first search processing unit 403.

FIG. 25 is an exemplification view of a character string having a possibility of matching with a plurality of reading formats, and FIG. 26 is an exemplification view of a reading format. The character string shown in FIG. 25 matches with the reading format No. 1 of "4-digit English letter" and the reading format No. 3 of "3-digit numeric character" of FIG. 26.

Therefor, it becomes a state in which it is unable to judge which reading format is more correct or wrong, and therefore it is judged that the possibility of a reading error is high. With this, there is a possibility that it matches with a reading format different from the originally assumed reading format, which makes it possible to maintain a high reading accuracy by judging that the possibility of a reading error is high and notifying a user of the possibility of a reading error.

Embodiment 5

The structure of a handy terminal 100 and the function block diagram according to Embodiment 5 of the present invention is the same as in Embodiment 1, and therefore the detail explanation will be omitted by allotting the same symbol. Embodiment 5 differs from Embodiments 1 to 4 in that it is judged whether there is a possibility that a character between characters was failed to read.

FIG. 27 is an exemplification view of a distribution histogram of a brightness value of a recognized character string. FIG. 27(a) shows a character string, while FIG. 27(b) shows a total number of pixels in which brightness values exist as a distribution chart. The character string "2013." and the character "2" include a peak point in the histogram, and therefore it is apparent that there are characters. On the other hand, a gradual peak area 271 exists in the histogram between the character of "2013." and the character of "2".

That is, although it cannot be specified whether it is a character, it is possible to indicate the possibility that some characters are failed to be read. Therefore, in cases where there is a peak area having a peak point equal to or larger than a predetermined value between a character and a character, it is judged that the possibility of a reading error is high and a warning is notified.

Figure 28:
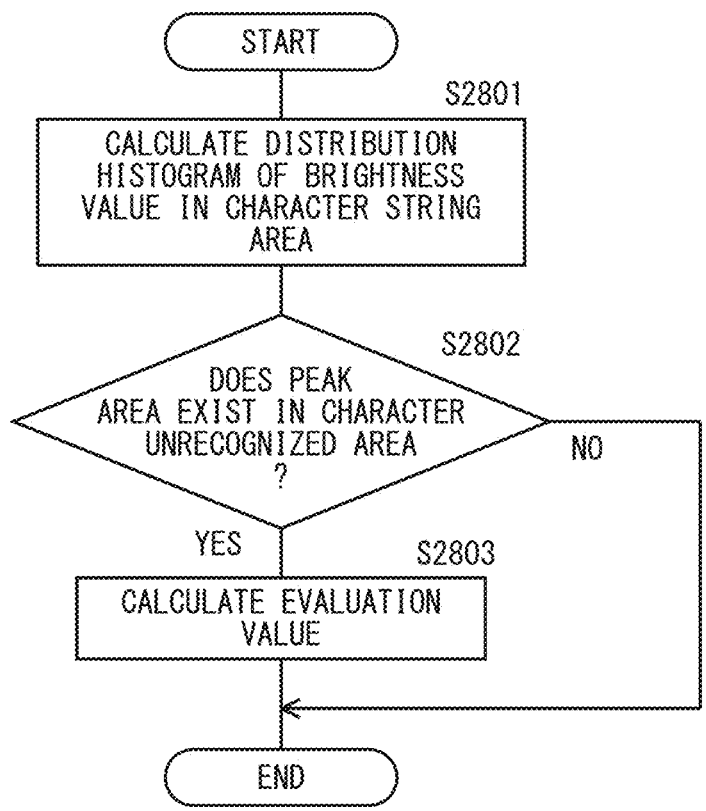
FIG. 28 is a flowchart showing a processing procedure of a CPU of a handy terminal according to Embodiment 5 of the present invention.

FIG. 28 is a flowchart showing a processing procedure of the CPU 101 of the handy terminal 100 according to Embodiment 5 of the present invention. In FIG. 28, the CPU 101 of the handy terminal 100 calculates a distribution histogram of bright values about the recognized character area (Step S2801).

The CPU 101 judges whether there is a peak area having a peak point which is equal to or larger than a predetermined value in an area in which no character was recognized based on the calculated distribution histogram (Step S2802). When the CPU 101 judges that there is no peak area (Step S2802: NO), the CPU 101 terminates the processing. When the CPU 101 judges that there is a peak area (Step S2802: YES), the CPU 101 calculates an evaluation value in accordance with a predetermined rule (Step S2803). With this, it becomes possible to notify a user when it is judged that the possibility of a reading error is high depending on the area of the histogram waveform.

As explained above, according to Embodiment 5, in cases where it is judged that the possibility of a reading error is high depending on an area of a histogram waveform, it is possible to notify a user of a warning, which makes it possible to maintain the high reading accuracy.

Embodiment 6

The structure of a handy terminal 100 and the function block diagram according to Embodiment 6 of the present invention is the same as in Embodiment 1, and therefore the detail explanation will be omitted by allotting the same symbol. Embodiment 6 differs from Embodiments 1 to 5 in that a possibility of a reading error in cases where a display is blurring, e.g., a character is blurring, is judged.

FIG. 29 is an exemplification view of a brightness value histogram of a handy terminal 100 according to Embodiment 6 of the present invention. In FIGS. 29(a) and 29(b), the vertical axis shows a frequency of a brightness value and the horizontal axis shows the brightness value.

As shown in FIG. 29(a), in cases where there is a character, the brightness value distribution is clearly separated between the background portion and the character portion. Therefore, normally, a valley portion clearly appears between peaks of the brightness values.

On the other hand, as shown in FIG. 29(b), in cases where a character is blurring or a character is not clear, the brightness value distribution is not clearly separated between the background portion and the character portion. Accordingly, a valley portion does not clearly appear between peaks of the brightness value, and therefore it cannot be judged that which brightness values show a character portion.

Therefore, the state between peaks of the brightness value is obtained as a variance by calculating a binary threshold, and the degree of separation is calculated as an evaluation value based on the obtained variance. In cases where the degree of separation is smaller than a predetermined threshold, it is judged that a character is blurring, and therefore it is possible to judge that the possibility of a reading error is high.

As explained above, according to Embodiment 6, in cases where an image captured a character is blurring, not clear, or the like, it is possible to judge that the possibility of a reading error is high and notify a user of a warning, which makes it possible to maintain the high reading accuracy.

The present invention is not limited to the aforementioned examples, and various changes, improvements, etc., can be performed within a range of the gist of the present invention. In the aforementioned example, values larger among a plurality of evaluation values calculated in FIG. 21 of Embodiment 3 are calculated as an overall evaluation value. However, needless to say, it can be configured such that evaluation values calculated in all Embodiments are integrated based on a calculation of an overall evaluation value and an overall evaluation value can be calculated as entire evaluation values.

FIG. 30 is an exemplification view in cases where an overall evaluation value is calculated by integration. The evaluation values of a plurality of evaluation items are calculated on a scale of one to ten, and the evaluation value having the maximum value in the entire evaluation values is regarded as an overall evaluation value. Then, it is judged whether there is a possibility of a reading error with regard to the recognized character string. In the example of FIG. 30, the evaluation value having the maximum value of "7" is considered to be an overall evaluation value, and for example when the predetermined threshold is "6," since the overall evaluation value exceeds the threshold, it is possible to judge that there is a possibility of a reading error.

In the examples, although the explanation is directed to the case in which a character string is read from the captured image, needless to say, it can be applied to various code readers such as a bar code, a QR code (registered trademark), etc.

What is claimed is:

1. A portable optical reader comprising:
    imaging unit configured to image a character string as a reading target;
    character string recognition unit configured to recognize the character string based on an image captured by the imaging unit;
    reading format storage unit configured to store a plurality of reading formats defining an attribute of a character string;
    first search processing unit configured to search a first reading format matched with a character string recognized by the character string recognition unit among a plurality of stored reading formats;
    second search processing unit configured to search a second reading format in which a character string matched with the first reading format matches as a partial character string among a plurality of stored reading formats; and
    notification unit configured to notify a possibility of a reading error regarding the recognized character string based on a search result of the second search processing unit.

2. The portable optical reader according to claim 1, wherein the notification unit notifies a possibility of a reading error when a matched second reading format is searched in the second search processing unit.

3. The portable optical reader according to claim 1, further comprising extraction unit configured to extract a highly reliable section of a character string including a partial character sting matched with the first reading format among the recognized character strings,
    wherein the second search processing unit searches a second reading format in which a character string matched with the first reading format matches as the partial character string and also is adaptable to a type of characters arranged in the highly reliable section.

4. The portable optical reader according to claim 1, further comprising:
    unit for setting a rectangular area expanded from a character area in an up and down, and left and right directions at a constant ratio every recognized character string;
    unit for calculating a ratio of white pixels in a set rectangular area; and
    unit for judging based on a calculated ratio whether there is a possibility of a reading error.

5. The portable optical reader according to claim 1, further comprising:
    unit for counting a number of pixels having a brightness value equal to or larger than a predetermined threshold in the character area every recognized character string;
    unit for calculating an evaluation value by calculating a ratio of a counted number of pixels to an entire number of pixels; and
    unit for judging based on the calculated evaluation value whether there is a possibility of a reading error.

6. The portable optical reader according to claim 1, further comprising:
    unit for extracting a pixel having a brightness value equal to or larger than a predetermined threshold in the character area every character of a recognized character string;
    unit for calculating a maximum consecutive number of extracted pixels in a vertical direction or in a lateral direction; and
    unit for judging based on the calculated maximum consecutive number whether there is a possibility of a reading error.

7. The portable optical reader according to claim 1, further comprising:
    unit for calculating a distribution histogram of a brightness value about the recognized character area; and
    unit for calculating an evaluation value based on the calculated distribution histogram;
    unit for judging based on the calculated evaluation value whether there is a possibility of a reading error every character.

8. The portable optical reader,
    wherein the unit for judging whether there is a possibility of a reading error calculates an overall evaluation value in which a plurality of evaluation values calculated in the portable optical reader according to claim 5 are integrated, and judges a possibility of a reading error every character based on the overall evaluation value.

9. The portable optical reader according to claim 1, wherein the notification unit notifies a possibility of a reading error when the first search processing unit searched a plurality of matched first reading formats.

10. The portable optical reader according to claim 1, further comprising display unit for displaying a read character string and displaying an updatable screen when the notification unit notifies a possibility of a reading error.

11. The portable optical reader according to claim 1, wherein in the first search processing unit, when no matched first reading format is searched, the notification unit notifies that the imaging unit images again to execute the processing.

12. An optical reading method capable of being executed by a portable optical reader equipped with imaging unit for imaging a character string as a reading target, character string recognition unit for recognizing a character string based on an image captured by the imaging unit, and reading format storage unit for storing a plurality of reading formats defining an attribute of the character string,
    wherein the portable optical reader includes:
    a first process for searching a first reading format matched with a character string recognized by the character string recognition unit among a plurality of stored reading formats;
    a second process for searching a second reading format in which a character string matched with the first reading format among a plurality of stored reading formats matches as a partial character string; and
    a third process for notifying a possibility of a reading error regarding the recognized character string based on a search result of the second search processing unit.

13. A computer program stored on a non-transitory computer-readable medium that is executed by a portable optical reader equipped with imaging unit for imaging a character string as a reading target, character string recognition unit for recognizing a character string based on an image captured by the imaging unit, and reading format storage unit for storing a plurality of reading formats defining an attribute of the character string,
    wherein the computer program makes the portable optical reader function as first processing unit for searching a first reading format matched with a character string recognized by the character string recognition unit among a plurality of stored reading formats;
second processing unit for searching a second reading format in which a character string matched with the first reading format among a plurality of stored reading formats matches as a partial character string; and
notification unit for notifying a possibility of a reading error regarding the recognized character string based on a search result of the second search processing unit.

* * * * *